United States Patent [19] [11] 4,053,670
LePoutre [45] Oct. 11, 1977

[54] NON-WOVEN FABRICS

[75] Inventor: Roger LePoutre, Croix, France

[73] Assignee: Lantor International Limited, Bolton, England

[21] Appl. No.: 627,621

[22] Filed: Oct. 31, 1975

[51] Int. Cl.² .............................................. B31F 1/00
[52] U.S. Cl. .................................. 428/156; 156/209; 156/220; 427/246; 427/381; 427/412; 428/321; 428/287
[58] Field of Search ............... 156/209, 219, 220, 305, 156/334, 622, 155; 260/2.51 AY; 264/136, 137, 284, 293, 213; 428/198, 171, 252, 287, 156; 427/246, 271, 276, 381, 412, 342

[56] References Cited
U.S. PATENT DOCUMENTS

| | | | |
|---|---|---|---|
| 3,437,509 | 4/1969 | Coisne | 427/342 |
| 3,494,781 | 2/1970 | Knibbe et al. | 427/246 |
| 3,765,927 | 1/1971 | Marzocchi | 427/412 |

Primary Examiner—David A. Simmons
Attorney, Agent, or Firm—Fred Philpitt

[57] ABSTRACT

A process for the manufacture of non-woven fabric which comprises the following steps:
  a. impregnating a web of non-woven fibers with a chemical binder capable of thermal polymerization and with a curing agent for the binder,
  b. coagulating but not drying the binder, to form a non-woven fabric,
  c. coating one face of the fabric with a paste or foam of a waterproofing agent,
  d. drying the impregnated and coated fabric and
  e. heat embossing the non-coated face of the fabric; non-woven fabric whenever made by the above process.

14 Claims, No Drawings

NON-WOVEN FABRICS

The present invention concerns improvements in and relating to non-woven fabrics.

It is well known that non-woven fabrics are more and more being used to replace woven fabrics due to their lower costs.

Nevertheless, it must be agreed that these "non-wovens" are not as strong as woven fabrics and in addition their appearance is less attractive due to the fact that the eye is conditioned to the appearance of standard woven fabrics. It is known that one of the principal faults of non-woven fabrics is delamination which allows relative displacement of the layers.

According to the present invention a process for the manufacture of non-woven fabric is provided which comprises the following steps:

a. impregnating a web of non-woven fibres with a chemical binder capable of thermal polymerisation and with a curing agent for the binder,
b. coagulating but not drying the binder, to form a non-woven fabric,
c. coating one face of the fabric with a paste or foam of a waterproofing agent,
d. drying the impregnated and coated fabric and
e. heat embossing the non-coated face of the fabric.

The heat embossing completes the polymerisation of the binder and by suitable choice of the embossing surface it is possible to produce non-woven fabric which has the appearance of a woven fabric. The fabric also has improved mechanical strength relative to existing non-woven fabric.

The invention includes non-woven fabric made by the above process which is suitable for uses, for example, book-binding, which have hitherto been reserved solely for woven fabrics.

In one embodiment of the invention a web of fibres is made by a conventional process using, for example, natural or synthetic fibres such as cotton or polyamide fibres or a mixture thereof. This web is then impregnated with a chemical binder capable of thermal polymerisation and with a curing agent for the binder. After coagulation of the binder one face of the fabric is coated with a paste of a waterproofing agent and dried so as to bring about partial polymerisation of the binder and drying of the paste. Next the web is heat embossed on the face remote from the coated face and this results in graining and also completes the polymerisation of the binder. It is advantageous to apply the waterproofing paste by roller.

This waterproofing paste plays various roles:

it makes the fabric impervious to air and limits the penetration of adhesives (for example in the case of book-binding avoiding strike through and reducing the amount of adhesive).

it gives body to the fabric and improves the embossing effect which becomes more prominent with consequent improvement in the "woven" effect when a suitable embossing surface is used and in the mechanical strength in the machine and cross-machine directions.

Applying the waterproofing paste to a non-woven fabric impregnated with undried binder and carrying out polymerisation and drying of the paste in a single operation permits not only a gain in time (one step less) but also better impermeability.

Since the embossing is carried out on the uncoated face this not only presents the appearance of a woven product when a suitable embossing surface has been used but also a textile handle. The proofing being limited to one face of the non-woven plays its parts by obstructing the passage of air and penetration of coatings and adhesives without altering the textile handle of the embossed face.

The invention is illustrated by the following Example.

EXAMPLE

A web of fibres formed from cotton fibres is impregnated with an acrylic or acrylonitrile binder at a rate of 50% of the fibre weight to which has been added 5% of the binder weight of active melamine as curing agent. Coagulation of the binder is brought about by subjecting the impregnated material to the action of a coagulating vapour which is formed above a bath containing boiling water to which had been added 5% of formic acid and 5% of ethyl alcohol. This process is described in detail in U.S. Pat. No. 3,437,509.

At this stage the non-woven fabric is formed by fibres bonded together by the coagulated, but not dried, binder. A waterproofing paste having the composition:

| | |
|---|---|
| Starch | 18% by weight |
| China Clay | 68% by weight |
| "Suifine" | 12% by weight |
| Wax Emulsion | 2% by weight | is applied by roller to one face of this fabric.

"Suifine" is a trade name of Moulins Company for tallow.

The fabric is then passed through an oven for about one minute at 170° C. by means of which polymerisation is initiated and the proofing paste is dried.

The fabric is then embossed on the uncoated side by means of a graining cylinder apparatus whose temperature is sufficient to soften the binder. This operation being carried out at high temperature confers on the graining of the non-woven a high degree of permanence and stability.

The embossed non-woven may be coloured by flexography or by other printing processes using various inks, and notably P.V.C. inks which confer increased abrasion resistance to the product. This printing is applied to the embossed face of the non-woven and this allows penetration of the non-woven by the ink and obviates powdering and white spotting frequently encountered on products coated only on the surface, due to wear or scaling of the coloured surface. It should also be noted that a variation of this process can be utilized consisting of printing the colour on to the non-embossed non-woven, the embossing under the conditions described above. This depends on the printing materials used being resistant to the temperatures used for embossing. One can also use current printing processes using coloured pastes and applying them according to the various known methods of this type of printing.

Another method of colouring which can be used is to colour the paste or foam and the binder in bulk by adding coloured mineral or organic pigments during their preparation. In this way, the non-woven cloth leaves the oven with its final colouring. All that is required then is for the embossing to be carried out either on the coated side or on the non-coated side in order to obtain the coloured product ready for use without having to apply colouring material by flexography or another method. Moreover, colouring the product in bulk can offer an advantage in relation to a colouring which only affects one side of the product as in the case with flexographic colouring or another method of printing.

The product of this invention is particularly useful in bookbinding but it is equally possible to use it for other outlets notably in the manufacture of tablecloths, Morocco goods or footwear. In such cases the product can be bonded on its proofed face with any kind of textile product or with a plastic coated fabric. It can also be coated on this proofed face with vinyl chloride, polyurethane or other plastic products.

It should be noted that the quantity of proofing paste deposited on the fabric can be varied by pressure of the roller in such a way as to obtain a slight air porosity which allows evacuation of gases which may possibly be released during the coating application. The product remains sufficiently proofed on the other hand to avoid penetration of the coating to the grained surface thus preserving the coloured appearance of that face.

I claim:

1. A process for the manufacture of non-woven fabric which consists essentially of the following steps:
   a. impregnating a web of non-woven fibres with a chemical binder capable of thermal polymerisation and with a curing agent for the binder,
   b. coagulating but not drying the binder, to form a non-woven fabric,
   c. coating one face of the fabric with a layer of a waterproofing agent,
   d. drying the impregnated and coated fabric and
   e. heat embossing the non-coated face of the fabric.

2. Process as claimed in claim 1 in which the waterproofing agent is applied by a roller.

3. Process as claimed in claim 1 in which the embossed face is coloured.

4. Process as claimed in claim 1 in which the face remote from the coated face is coloured prior to embossing.

5. Process as claimed in claim 1 in which the fabric is bonded on its coated surface to a textile material.

6. Process as claimed in claim 1 in which the fabric is bonded on its coated surface to a plastic coated fabric.

7. Process as claimed in claim 1 in which the fabric is further coated on the coated surface with vinyl chloride.

8. Process as claimed in claim 1 in which the fabric is further coated on the coated surface with polyurethane.

9. Process as claimed in claim 1 in which the layer contains coloured mineral or organic pigments.

10. Process as claimed in claim 1 in which the binder contains coloured mineral or organic pigments.

11. Non-woven fabric whenever made by the process as claimed in claim 1.

12. A process according to claim 1 wherein the waterproofing layer is composed of

| | |
|---|---|
| starch | 18% by weight |
| china clay | 68% by weight |
| tallow | 12% by weight |
| wax emulsion | 2% by weight |

13. A process according to claim 12 wherein the binder is an acrylic binder and said non-woven fibres are cotton fibres.

14. A process according to claim 12 wherein the binder is an acrylonitrile binder and said non-woven fibers are cotton fibres.

* * * * *